United States Patent [19]

Claytor

[11] Patent Number: 4,473,824
[45] Date of Patent: Sep. 25, 1984

[54] PRICE QUOTATION SYSTEM
[75] Inventor: Richard N. Claytor, Arlington, Tex.
[73] Assignees: Nelson B. Hunter; Thomas A. Swicegood
[21] Appl. No.: 516,470
[22] Filed: Jul. 22, 1983

Related U.S. Application Data

[63] Continuation of Ser. No. 278,863, Jun. 29, 1981, abandoned.
[51] Int. Cl.³ .......................... H04Q 9/00; H04B 7/00
[52] U.S. Cl. ................................ 340/825.27; 340/792; 455/38
[58] Field of Search .................. 340/825.26, 825.27, 340/825.44, 792; 364/408, 200, 900; 455/53, 54, 7, 11, 38, 89; 375/7, 8; 370/43, 40

[56] References Cited

U.S. PATENT DOCUMENTS

| | | |
|---|---|---|
| 3,113,294 | 12/1963 | Parker . |
| 3,387,268 | 6/1968 | Epstein . |
| 3,573,732 | 4/1971 | Greenblum ..................... 340/825.27 |
| 3,611,294 | 10/1971 | O'Neill . |
| 3,716,835 | 2/1973 | Weinberg et al. . |
| 3,885,217 | 5/1975 | Cintron . |
| 3,937,004 | 2/1976 | Natori et al. ................... 340/825.44 |
| 4,048,619 | 9/1977 | Forman, Jr. et al. . |
| 4,112,369 | 9/1978 | Forman et al. . |
| 4,196,310 | 4/1980 | Forman et al. . |
| 4,358,756 | 11/1982 | Morel et al. ..................... 340/825.7 |
| 4,383,257 | 5/1983 | Giallanza et al. .............. 340/825.47 |

Primary Examiner—Donald J. Yusko
Attorney, Agent, or Firm—Sigalos & Levine

[57] ABSTRACT

A price quotation system for conveying quotations of interest to the financial community comprising a transmitter for receiving a plurality of said quotations and broadcasting serial data representing each of said quotations, a handheld, portable receiver for receiving the serially transmitted data, storage means in the handheld receiver for individually storing the serially received data representing each of the quotations, a display on the handheld receiver, and means on the handheld receiver coupled to the storage means and the display means for individually selecting the stored data representing any one of the quotations and displaying it as a selected quotation.

22 Claims, 5 Drawing Figures

PRICE QUOTATION SYSTEM

BACKGROUND OF THE INVENTION

This is a continuation of application Ser. No. 278,863 filed June 29, 1981, now abandoned.

The present invention pertains to a price quotation system capable of transmitting stock bond, option, commodity, and like quotations of interest to the financial community to receivers small enough to be carried in a pocket, if desired. The invention includes apparatus for transmitting the quotations and additional apparatus for receiving the transmitted quotations, storing them in memory and subsequently recalling them from memory and displaying them on command.

Security quotations generally consist of an alphanumeric code of up to eight characters which define uniquely the security, including, if appropriate, information such as the exchange upon which it is traded and its date of issue or maturity. This code is easily recognized by those in the financial community.

Prior art systems such as that disclosed in U.S. Pat. No. 3,387,268 did indeed store quotation information at what was known as "tape watcher apparatus" and provided a warning signal for unusual activity. However, only a few selected issues (ten in the embodiment) could be stored. The method of selecting the issues to be stored is also rather cumbersome and representative of obsolete technology. It utilized the method of laboriously flipping ten sets of toggle switches to form a name in binary code. Furthermore, the warnings discussed in the patent do not originate at the transmitter, but instead are derived from the watched issues (one such warning would occur at every trade of a watched stock and with contemporary market volume, the warning would be constantly given).

In U.S. Pat. No. 2,611,924, the device has no local memory at the receiving unit. Good response time to information requests at the receiving unit requires that data be continuously transmitted since there is no link back to the transmitter and no local storage. This necessitates a large receiver bandwidth, and hence, high susceptibility to noise (i.e., a high error rate) and a high power consumption. Further, there is no provision for warnings in this device.

U.S. Pat. No. 3,716,835 relates to a personal stock quotation system but does not describe the apparatus which is the subject of the present invention. It simply relates to a stock quotation terminal provided with a cradle for a telephone handset and control signals for obtaining the stock information from a central computer and display means for displaying the stock information obtained from the central data processing system.

U.S. Pat. No. 3,885,217 describes a generalized data transmission system which transmits coded data as noise on another transmission. Both transmissions thus suffer and the scheme could not be used to transmit at a sufficiently high data rate to satisfy the needs of the present invention.

U.S. Pat. No. 4,048,619 uses multiple transmitters but the reason is unknown and unexplained. Further, the device does not appear to store data at the receiver and hence requires a high data rate with consequent high error rate and high power consumption. It uses a "key word" subscriber-actuated code to prevent unauthorized use and to decode the incoming information.

U.S. Pat. No. 4,112,369 uses a single transmitter and has local storage in a RAM (within the receiver terminal) but stores only 128 8-bit words. Thus, the RAM is obviously used only as a buffer. It also utilizes a key word to decode the incoming data and to prevent unauthorized use.

U.S. Pat. No. 4,196,310 operates in essentially the same manner as the previously described patent with some errors corrected and the explanations clarified.

Thus, none of the above patents discloses the most desirable feature of the present invention, and that is, a local memory in which quotations for all transmitted issues are stored. This type of memory is made practical by bubble memories or dynamic RAM or static RAM semiconductor memories with static RAM having the most desirable characteristics. The receiver unit is made practical by the extremely low data transmission rate (and hence, low bandwidth, low error rate, and low power consumption) which the use of a local memory permits.

Furthermore, none of the above patents discloses warning signals directly communicated to the receiver from the transmitter, an important part of the present invention.

SUMMARY OF THE PRESENT INVENTION

Thus, it is an object of the present invention to provide a price quotation system for conveying quotations of interest to the financial community comprising a transmitter for receiving a plurality of said quotations and broadcasting serial data representing each of said quotations; a handheld, portable receiver for receiving said serially transmitted data; storage means in said handheld receiver for individually storing said serially received data representing each of said quotations; a display on said handheld receiver and means on said handheld receiver coupled to said storage means and said display means for individually selecting said stored data representing any one of said quotations and displaying it as a selected quotation. It is also an object of the present invention to provide a method of conveying quotations of interest to the financial community comprising the steps of transmitting serial data representing each of said quotations of interest, receiving said data with a portable handheld receiver, providing a memory in said receiver for individually storing said data representing each of said quotations of interest, providing a display on said receiver and selectively coupling data in said memory representing any desired one of said quotations of interest to said display for observation by the user thereof.

BRIEF DESCRIPTION OF THE DRAWINGS

These and other objects of the instant invention may be had by referring to the following specification and drawings in which like numerals indicate like components and in which.

DESCRIPTION OF THE PREFERRED EMBODIMENT

As stated earlier, security quotations generally consist of an alphanumeric code of up to eight characters which defines uniquely the security. However, of the enormous number of securities implied by the eight-character code, only about 3,000 separate securities need be accommodated in a quotation system. More securities can be accommodated as necessary, however. A 12-bit code can be used to represent uniquely these 3,000 securities with 1,096 unique 12-bit characters remaining for expansion and/or for control or other information. Subsequently, in this application, the 12-bit code representing a particular security shall be called its "name". Obviously if future needs dictate the 12-bit code can be lengthened to accommodate more than the 4,096 possible securities set forth above.

Price information (subsequently called "price") is associated with each name. Following historical precedence, price consists of an integer number which does not exceed 400 followed by nothing or by one of the following fractions: $\frac{1}{8}, \frac{1}{4}, \frac{3}{8}, \frac{1}{2}, \frac{5}{8}, \frac{3}{4}$, or $\frac{7}{8}$. The price can thus also be represented as a 12-bit code, 3-bits for the fractional part and 9-bits for integers up to 511.

The price associated with a name may change from time to time as transactions occur. It is only necessary that the price associated with a name and held in memory be updated when a transaction occurs which results in a change in price. However, transmissions may be activated either by the occurrence of a transaction or the occurrence of a transaction in which a price change occurs; in the simplest case, the operation will be indistinguishable to the user. The preferred embodiment herein is based upon a transmission at the occurrence of every transaction.

Quotations proceed at a relatively slow rate by data transmission standards, with a maximum rate of 300 quotations per minute possible on any of seven exchanges. For each quotation, the name (12-bits) and the price (12-bits) must be transmitted. This corresponds to a data transmission rate of 300 transactions per minute times (12+12) bits times 7 exchanges or 50,400 bits per minute or 840 bits per second. This data transmission rate is suited for transmission over channels of reasonable bandwidth. Furthermore, all seven exchanges are not capable of sustaining the maximum transaction rate (historically, no exchange sustains the maximum transaction rate for any length of time). A more realistic data transmission rate is about 250 bits per second, a rate which is suited to transmission over such channels as phone lines. Synchronizing characters and start and stop bits need add no more than 50 bits per second to this figure to produce a reasonably error-free code.

Figure 1:
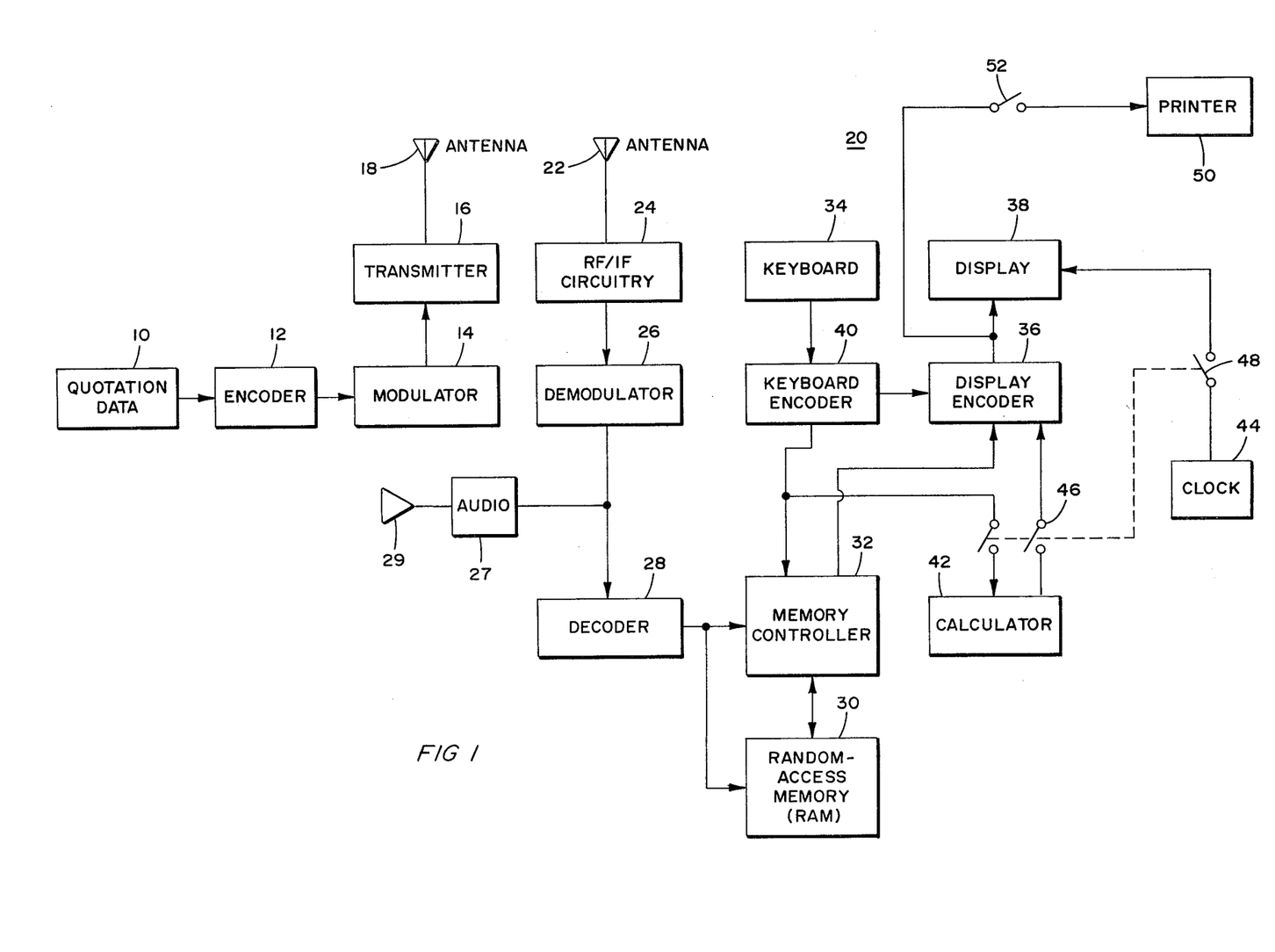
FIG. 1 is a generalized block diagram of the novel invention.

The most reasonable organization for the quotation system appears in simplified block diagram form in FIG. 1. Quotation data 10 are brought to an encoder 12 which is programmed to convert the data for each quotation to a sequential pair of serial 12-bit name and price codes. These codes are then used to modulate a transmitter carrier by modulator 14 by one of a number of possible standard techniques. The data are then broadcast by transmitter 16 over antenna 18.

A portable handheld receiver, generally designated by the numeral 20, then receives the modulated carrier through antenna 22 which is coupled to conventional RF/IF circuitry 24, the output of which is coupled to demodulator 26. There it is demodulated to recover the sequential pair of serial 12-bit codes (i.e., name code and price code) which are utilized by decoder 28. The name code is used to address a particular memory location in the random access memory 30 through the memory controller 32. The price code information previously stored in the address at that particular memory location is then erased and the new price code is written into the addressed memory location under command from the memory controller 32. As additional name-price pairs are transmitted, they are used to update price information stored in memory 30.

On command from keyboard 34 which is located on the receiver 20, each memory location in RAM 30 can be addressed and the price information stored there read out through the display encoder 36 and shown on display 38. Keyboard encoder 40 accepts the signals from keyboard 34 and acts an interface with the memory controller 32 by providing the proper signals which can be accepted by the memory controller 32 and the random access memory 30. Thus, the keyboard command is entered as an eight character maximum code designating the security or stock quotation in terms familiar to the financial community (e.g., GMp5 or GTEc490). The keyboard command produces a legible display on the receiver's display unit 38 in the same eight-character (maximum) code through the action of the keyboard encoder 40 and display encoder 36. The information (price) read from the memory 30 by the memory controller 32 is displayed through the action of the display encoder 36 as an integer less than 400 followed by nothing or one of the following fractions: $\frac{1}{8}, \frac{1}{4}, \frac{3}{8}, \frac{1}{2}, \frac{5}{8}, \frac{3}{4}$, or $\frac{7}{8}$. An invalid code punched in on the keyboard results in the display of "error". The system design as disclosed herein has several substantial advantages. First, the name and price codes are succinct and compact. Since these codes are used to modulate the transmitter, the data transmission rate (and hence, the required bandwidth) is as low as possible. Secondly, storing the price in the receiver has a two-fold advantage: there is no need to provide transmitting capability in the receiver since the price is held locally and holding the price locally opens the door to improvements to the apparatus such as the capability to detect (locally) high activity in any quotation or price rises or falls outside pre-set limits, again for any quotation.

Further, the receiver unit contains a calculator 42 and a time-of-day clock 44. Inasmuch as clock pulses are already provided for timing purposes, it is quite simple to add either a single chip or two separate chips for the calculator 42 and time-of-day clock 44. Switches 46 and 48 are part of a mode switch 148, shown in FIG. 4, which can be used to select either the quotation system, the calculator, 42, or the time-of-day clock 44. Whichever mode the unit is in, the receiver receives stock quotation data and updates the information stored in random access memory 30. When the unit is placed in either the calculator mode or the clock mode, the receiver is still operating and storing updated security quotation data.

Further, with modern technology producing very small printers, a printer 50 may be added to the unit if desired and operated through an on-off switch 52. Thus, any particular display of stock quantities may be actually printed by printer 50 for use of the operator.

Figure 2:
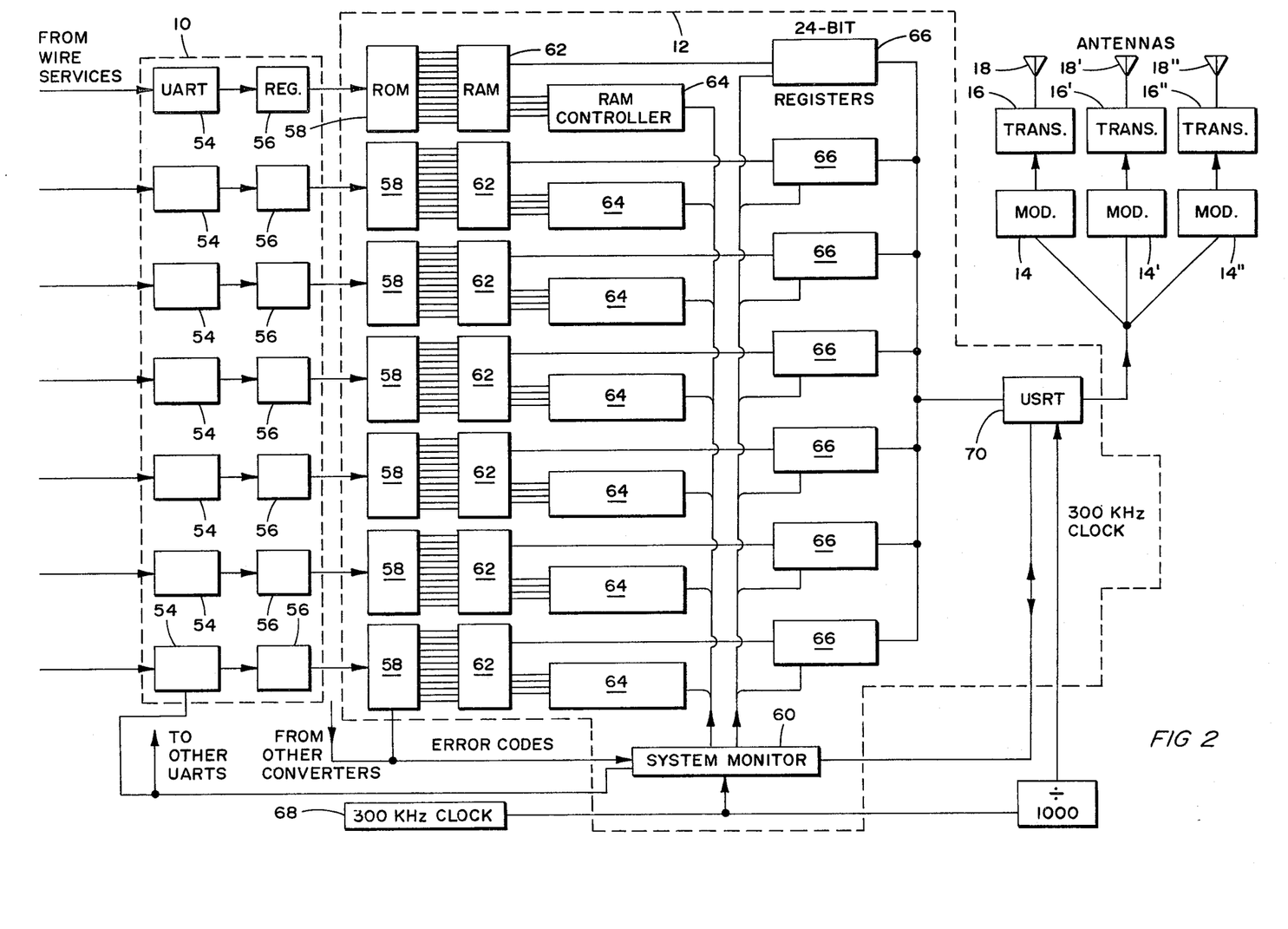
FIG. 2 is a schematic block diagram of the transmitter circuit.

FIG. 2 is a detailed system design of the transmitter. Quotations are received at the quotation data input circuits 10 at the transmitter site via wire service from the several different exchanges. Seven exchangers are presently considered major enough to be included in this system. These quotations are in the form of a designator followed by a sales volume figure followed by a price. The wire service provides this information in an 8-bit asynchronous serial ASCII code. A Universal Asychronous Receiver and Transmitter (hereinafter called UART) similar to the NEC PD369 or the Western Digital 1602 is used to convert this incoming serial information to serial sets of parallel information which are then stored in registers 56. Each UART 54 operates at a rate dictated by the baud rate of the incoming wire service.

The encoder 12, including ROM encoder 58, is operated synchronously by system monitor 60 with registers 56 to convert the serial sets of parallel information to sequential 12-bit parallel codes representing the name and price (sales volume information is ignored since it is often confusing and inconsistent as presented by the exchanges) data presented by the wire services. Multiple mask-programmable 4K ROMS 62, such as the Mostek MK-2500, are suitable for the ROM encoder 58. Two such ROM units are required: one for name and one for price. The two ROMS can be considered as one RAM 58 as shown in FIG. 2.

Thus, each incoming wire service data signal can be used to produce a unique 12-bit code name for each security with the recognition that identical codes received from various exchanges can be made unique through the knowledge of the originating exchange and the simple addition of ID bits for each exchange. These ID bits are added by ROM 58.

Since it is possible that a quotation from one exchange will be received while that from another is being processed, buffer storage must be provided for queuing purposes. Storage of the compact name and price is preferable. It is also possible that quotations will be received from two (or more) exchanges simultaneously. To resolve deadlocks, the quotation from the highest priority exchange (i.e., the most active exchange) is processed first, and the others in proper order. Other quotations in buffer storage are processed on a first-in, first-out (FIFO) basis. The system monitor 60 resolves deadlocks and reads information from storage according to the above rules. Ram 62, which is controlled by RAM controller 64, serves as the necessary buffer storage.

Buffer storage at the transmitter need not be particularly large since the system's data transmission rate can easily be made high enough to handle the average quotation rate on all seven exchanges chosen for inclusion in the system. However, buffer storage is reasonably inexpensive, and the transmitter need not be particularly small or lightweight. The buffer storage for each exchange must hold at least seven name-price pairs, i.e., at least 168 bits. A 256-bit random access memory 62 (RAM) such as a Motorola MCM 14537c would suffice. Buffer storage registers 66 may be provided as additional storage to hold the information prior to conversion in serial form for transmission.

The sequential 12-bit parallel codes representing name and price must be converted to serial codes for transmission. Since the receiver does not have "acknowledgment" capability (especially since there are multiple receivers), a synchronous code is used. Such a code necessitates the use of extra synchronizing characters and accurate (crystal controlled) clocks, such as clock 68, in the transmitter and the receivers but it is well suited to the application.

A Universal Synchronous Receiver and Transmitter 70 (hereinafter referred to as USRT) is used to perform this task. The Intel 8251 and the Motorola "SSDA" are prototypical.

Modulators 14 may use several modulation schemes which are suited to the present application. These include amplitude modulation (AM), frequency modulation (FM), frequency shift keying (FSK), phase shift keying (PSK), pulse code modulation (PCM), and the like. Again, it is immaterial to a great degree which modulation scheme is used.

Further, rather than a single transmitter, multiple transmitters 16, 16' and 16" each operating on a different frequency on a network similar to the NOAA Weather Radio Network are used. The exact nature of the transmitters is not particularly important to the application, but high frequencies are desirable because of their penetration of buildings, tunnels, and the like. Vertical polarization of the antenna is desirable because of the personal portable nature of the receivers. The transmitters can be units dedicated to the quotation network, they can be commercial FM or television transmitters with multiplexed data transmission capability, or they can even be satellite-borne. Since multiple transmitters are used, quotation information is best converted to a 12-bit code at some central location and sent to the separate transmitters in compact form.

Name-price pairs are transmitted upon, and only upon, the receipt of quotation information from one of the included exchanges.

Certain other functions are also added to the transmitted signals. They include a signal to sound an audible warning at the receiver if the activity of the market exceeds a certain level or the value of popular averages rises or falls at an extraordinary rate. The warning could also be sounded if news events warranted it (outbreak of war, congressional action, and the like). These functions can be encoded with an appropriate 12-bit code just as if they were quotations. The receiver can interpret these codes, addressing an appropriate display, sounding a warning tone, and the like instead of storing the signal in a specific memory location.

Also, information such as price to earnings ratio, dividends, Dow Jones averages, Standard and Poor 500 price to earnings ratio, advance-decline indicators and the like information important to those interested in securities could also be transmitted to and selectively displayed by the receiver.

The transmitter must also provide a "power down" signal to the receiver to permit the receiver to conserve power during periods without price update activity. The transmission of synchronizing characters (as practiced in synchronous coding) serves as a "power up" signal to return the receiver's memory to a state of readiness to erase and write, assuming a "power down" signal has been received earlier.

In the simplest system, errors in the quotation information arriving at the central location produce several possible results. First, the price information could be incorrect. This sort of error would be difficult to detect unless the error were large. Large errors can be found through the application of equipment to detect large changes in price and then central location personnel could be advised to check the price by alternate means. Thus, a comparator could be used to compare the previous price with the new price and if the comparator indicates that the new price exceeds a preset level indicating a certain percent of the previous price, a warning signal could be produced so that the user could advise central location personnel to check the price.

Secondly, the name information could be incorrect such that the name could correspond to a different valid name. Again, this would be difficult to detect if the prices of the two securities were nearly identical.

Thirdly, the name information could be incorrect such that the name corresponded to no valid name. This type of error would be easy to detect in the encoder 12. The name could simply be compared with all stored names for a particular exchange in ROM 58, and if no comparison results, an error signal could be generated in the form of an audible signal which could be used to halt processing of the security data and to alert central location personnel. In a sophisticated system, personnel at the central location watching a monitor would supply error correction capability (for those errors which can be detected) via a keyboard. Such a system would require additional buffer storage, a delay before transmission, and multiple editing stations to accommodate peak data transmission rates. Naturally the error could well be corrected as a matter of course during the transmission which follows the next transaction.

Figure 3A:
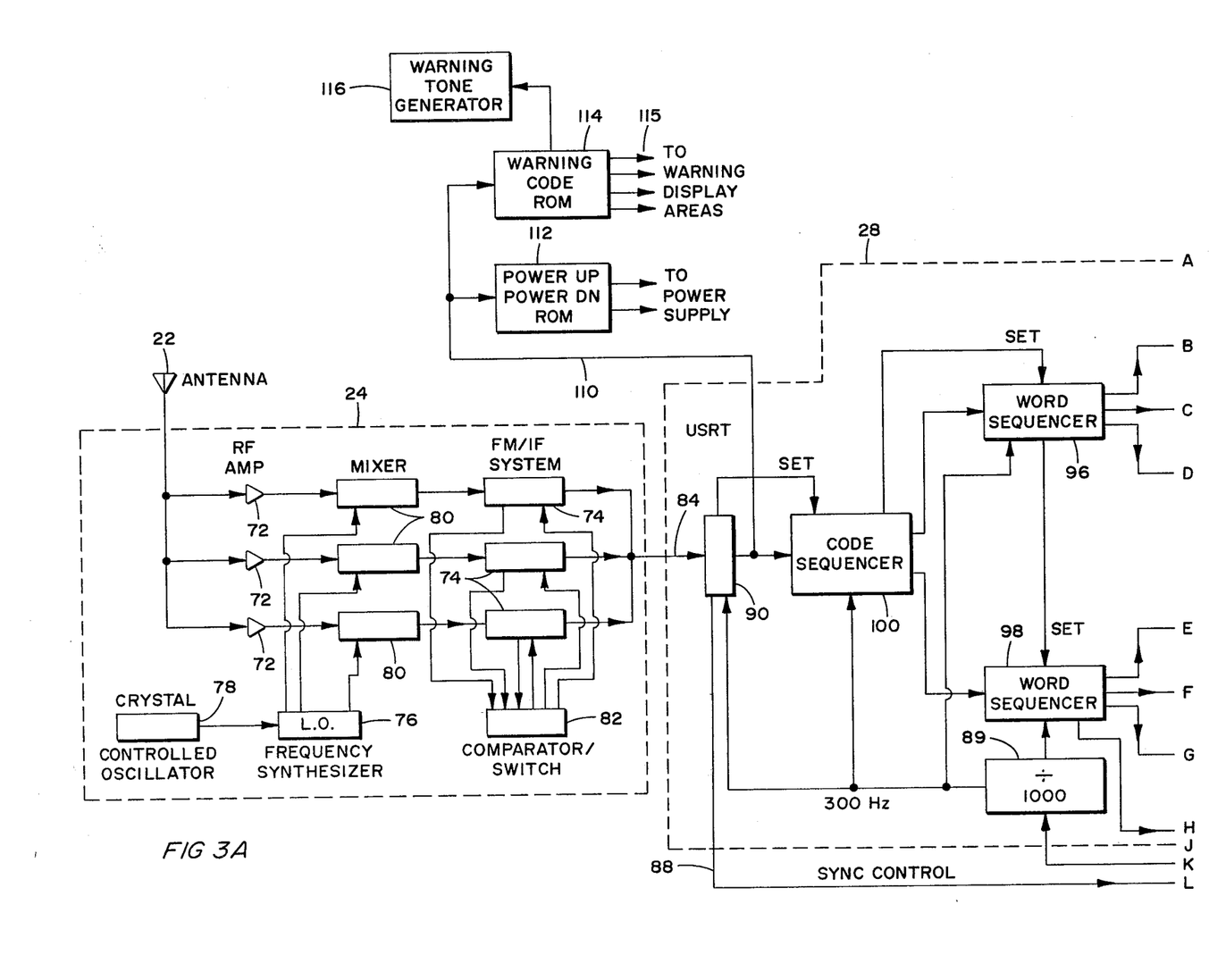
FIG. 3A, 3B are a schematic block diagram of the handheld portable receiver.
Figure 3B:
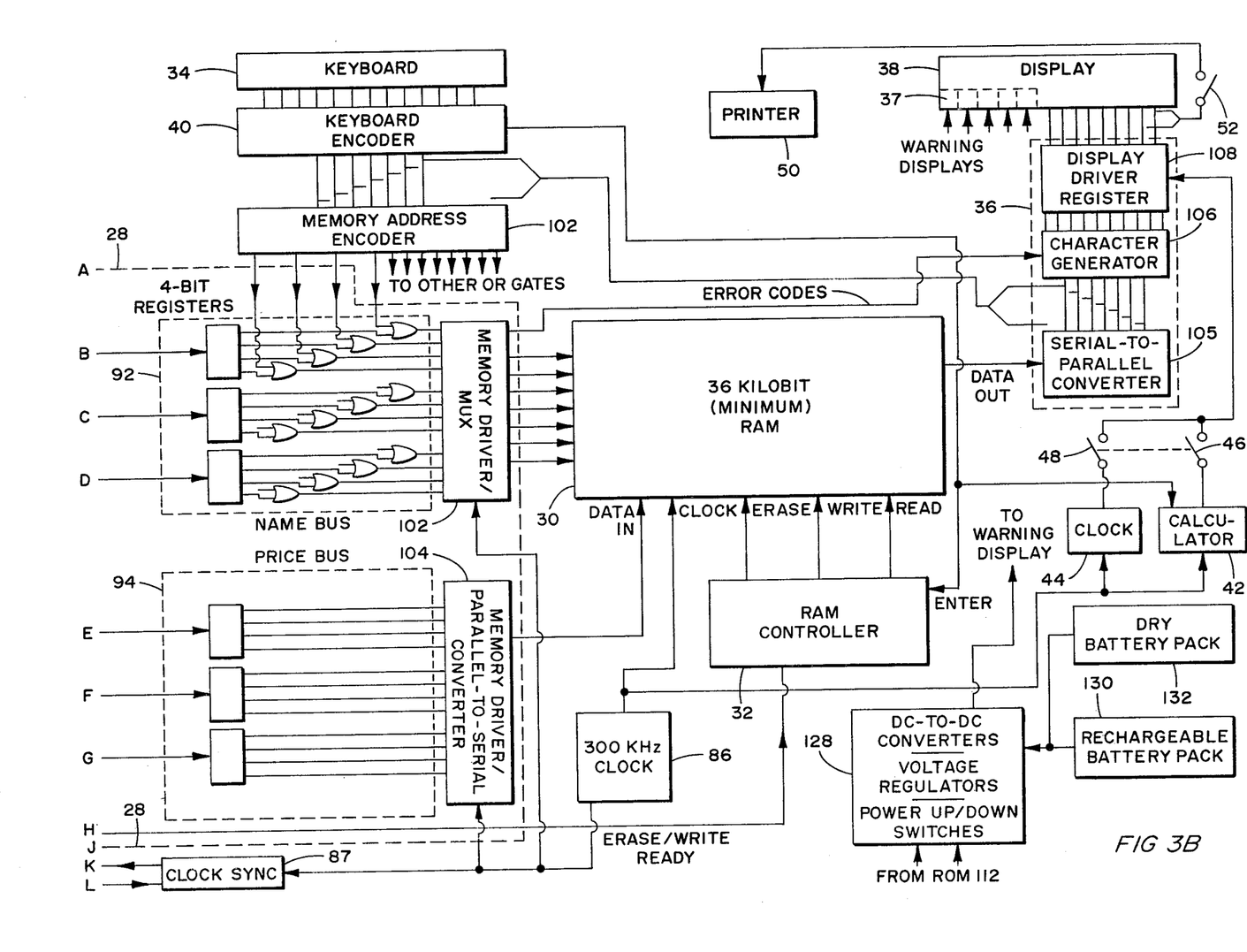

A schematic representation of the novel receiver is shown in FIG. 3. The signal from the transmitter unit 16 in FIG. 1 and FIG. 2 is received by antenna 22 in FIG. 3 and coupled to RF/IF/demodulator portion 24. Portion 24 includes the demodulator 26 shown as a separate block in FIG. 1. Portion 24 receives the transmitted signal and demodulates it. The exact nature of the circuitry depends upon the exact nature of the transmitter network. For example, if the signal is multiplexed on commercial FM stations, circuitry such as the National LM-703 (RF amplifier 72) and National LM-3089 (FM/IF system 74) integrated circuits can be used.

Independent of the exact nature of the transmitting network, the receiver's local oscillator 76 should be crystal controlled as by crystal controlled oscillator 78. Thus, the local oscillator frequency, when coupled to mixers 80, provides an FM/IF signal to FM/IF system 74.

Inasmuch as three different frequency signals have been transmitted by antennas 18, 18' and 18" shown in FIG. 2, circuitry must also be incorporated to decide, on a minute by minute basis, which of the transmitting network transmitters is being best received and to switch the receiver to that transmitter. This can be accomplished by comparator/switch units 82 which operate in a well-known manner to compare the input signals with a predetermined standard or with each other and the best received signal is processed by the system.

The RF/IF/demodulator portion 24 of the receiver must operate continuously in order to receive a "power up" code from the transmitting network to activate the receiver's memory portion. This enables the power to be conserved in the remainder of the circuits of the receiver. It will be recalled that the transmitter provides a "power down" signal to the receiver to permit the receiver to conserve power during periods without price update activity. Thus, the "power up" signal returns the receiver's memory to a state of readiness to erase and write.

The receiver's demodulator output on line 84 consists of sequential pairs of serial 12-bit codes (organized as sets of three 4-bit words) and synchronizing characters. These codes and synchronizing characters are clocked at a fixed rate, for instance 300 HZ, derived from the transmitter clock 68. An accurate (crystal controlled) clock 86 is built into the receiver and operates at 300 kilohertz to allow the synchronizing circuit (USRT 90 and synchronizer 87) to align, accurately and frequently, the receiver's clock phase to the transmitted signal. The USRT 90 strips the synchronizing characters from the code and provides a synchronizing signal on a control bus 88 to operate the clock synchronizer 87. Typical integrated circuits to perform this function include the Intel 8251 USART and the Zilog Synchronous Serial Interface.

The synchronized 12-bit name and price codes from the USRT 90 are input to a serial-to-parallel converter. The converter consists of two sets of three 4-bit serial-to-parallel name and price converters 92 and 94 respectively. The input to each 4-bit converter 92 and 94 is controlled by a word sequencer, 96 and 98 respectively. The input to each of the word sequencers 96 and 98 is controlled by a code sequencer 100, the action of which is initiated by a control signal from USRT 90.

The output of the serial-to-parallel converter thus consists of two 12-bit parallel codes: the name, which is subsequently used as the memory address for RAM 30 and the price, which is the information (data) to be stored in the RAM 30. Each code appears of 12 separate lines: the name or address bus and the price or data bus.

The random access memory or RAM 30 is the brain of the receiver. Quotations in the form of 12-bit codes are stored in each of the locations corresponding uniquely to the number of securities in the quotation system. If 3,000 securities are to be stored, then 3,000 unique locations are to be designated in RAM 30. If 6,000 stocks or securities are to be utilized, then 6,000 locations would be represented in RAM 30.

The exact nature of RAM 30 is unimportant. It can be made from semiconductor memories in the form (for example only) of three or more 16K dynamic or static RAM integrated circuits (Mostek MK-4116) or twelve or more 4K RAM integrated circuits (Mostek MK-4104) or one or more 64K dynamic RAM integrated circuit (Mostek MK-4164) or from charge coupled devices or from bubble memories (Texas Instruments TIB-0203). The RAM 30 is shown, consequently, simply as a block. Memory drivers 102 and 104 are shown on the address and data busses, respectively. These circuits should be chosen appropriate to the memory used. Refresh circuits and so forth should be provided as required. Each of the memory systems mentioned above is capable of storing (at least) 4,096 12-bit words and the associated circuitry is capable of addressing (at least) 4,096 locations. Consequently, some room for future expansion can be built into the receiver.

Presently, the best compromise between price, availability, size, and power consumption is made by using 16K static RAM circuits. Future developments will change this in favor of one or more 64K or 128K static RAM integrated circuits which are not presently available.

Erase, write, read, and refresh if necessary (it is not necessary with a static RAM), can be accomplished at speeds far greater than the incoming data rate or the keyboard entry rate. These memory functions can be accomplished in times as short as 250 nanoseconds, more than 1,000 times faster than the data tranmission rate. The 300 kilohertz clock 86 (approximately three microseconds cycle time) mentioned earlier is sufficiently fast to perform all memory functions.

Such a high clock rate (relative to the data and keyboard entry rates) makes the problem of priorities simple. No queue is necessary and erase, write, read, and refresh can all be accomplished in a few percent of the width of a data pulse.

The RAM controller 32 may be a computer-like circuit consisting of hardware only or it may be a microprocessor, consisting of hardware and software as universally recognized. In the latter case, the RAM controller 32 can be programmed from keyboard 34, leading to improved capabilities such as the monitoring of price movements on a plurality of securities and sounding a warning when one price moves outside of preset limits, such as the monitoring of the ratio of the prices of two securities or their difference and sounding a warning based on some preset parameters, or such as the monitoring of the transaction rate of individual securities.

Figure 4:
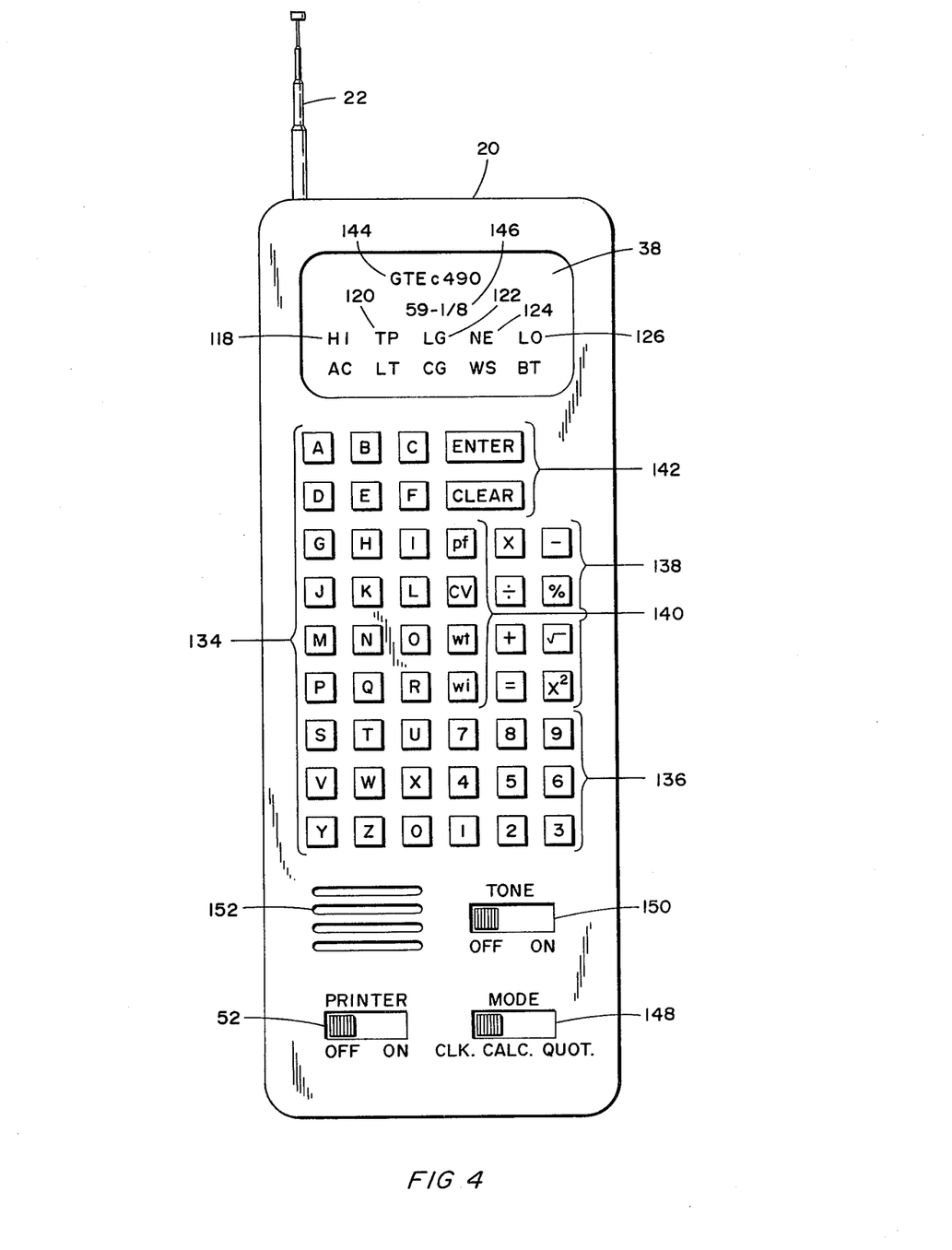
FIG. 4 is an illustrative view of the front of the novel handheld portable receiver.

A primitive keyboard 34, shown in detail in FIG. 4, is used to recall quotations stored in the receiver's memory, to set the time-of-day clock or its related functions, or to operate the calculator 42. An eight character alphanumeric code describing the security and familiar to the financial community is punched into the keyboard 34 by the user. A keyboard encoder 40 (such as a Standard Microsystems 2376) produces an 8-bit ASCII code from the keyboard input. This 8-bit code is stored in eight 8-bit registers. A ROM-based memory address encoder 102 translates the information in the eight registers to the appropriate 12-bit memory address code. Fairchild 3514 4096-bit ROM circuits are suitable for this purpose.

The contents of the eight 8-bit keyboard registers in keyboard encoder 40 are used by the character generator 106 in display encoder 36 (for example, a Standard Microsystems 5004) and display driver 108 (similar to a Fairchild FWA-6117) to produce a visible (7×9 dot matrix or other) display on the liquid crystal or other suitable display unit 38. The alphanumeric characters displayed correspond exactly to the code punched into the keyboard and permit a visual check of the information selected through the keyboard.

When the "enter" button on the keyboard 34 (shown in FIG. 4) is pressed, the 12-bit code stored in the RAM memory location corresponding to the keyboard entry is read out to the character generator 106 through serial-to-parallel converter 105. The character generator 106 produces (through the display driver 108) a (7×9 dot matrix or other) display corresponding to the quoted price stored in the RAM 30 in the form of (up to) three decimal digits followed by nothing or by one of the following fractions: $\frac{1}{8}$, $\frac{1}{4}$, $\frac{3}{8}$, $\frac{1}{2}$, $\frac{5}{8}$, $\frac{3}{4}$ or $\frac{7}{8}$. If no memory location corresponds to the keyboard entry, the word "error" is displayed.

Thus, it can be seen that the data stored in RAM 30, representing all of the security price quotations being transmitted, can be selectively displayed on display 38 thus giving the user a constant access to the latest updated market quotations.

Particular codes may be sent by the transmitting network shown in FIG. 1 and FIG. 2, and are used for auxiliary functions. They include the "power up" and "power down" codes which have already been discussed. Thus, as shown in FIG. 3, the output of USRT 90 on line 110 is coupled to the power up, power down ROM 112 which is utilized to reduce power to the RAM 30 to the stand-by condition, if appropriate, and to connect or disconnect the power supply to the appropriate receiver circuits other than those which are always powered such as the RF/IF/demodulator system 24. This action can be accomplished in any of a number of well-known ways.

In addition, if the unique warning code is transmitted, the output of USRT 90 on line 110 is accepted by warning code ROM 114 which activates warning tone generator 116. This code warning may represent unusually high market activity and produces a brief, audible warning signal at the receiver. In addition, an appropriate message may be visible on display 38 in special areas 37 via lines 115. The audible warning may be repeated periodically if activity remains high. It alerts the system user to check the value of securities of interest. Thus, as shown in FIG. 4, on the display 38, the code which is designated as 118 may be displayed as a result of the warning.

In addition, a code warning of periods of the transmission of unreliable quotations may occur when an exchange's quotation system falls behind the market ("late tape"). During such periods, quotations are not only not timely, but may contain inaccurate price information brought about by the abbreviation of this information. Again, the receiver warns of the "late tape" condition through an audible signal produced by warning tone generator 116 and an appropriate display such as designated by the numeral 120 in FIG. 4. The warning prompts the user to go immediately to or contact a brokerage house for more reliable information if he so desires.

In addition, a code warning of a large change in the market averages may also produce an audible signal and an appropriate display such as designated by the numeral 122 in FIG. 4.

Also, a code warning of news of potential import to the markets (favorable or unfavorable domestic or international political developments, natural disasters, bankruptcies, and the like) also produces an audible signal and an appropriate warning message at the display such as designated by the numeral 124 in FIG. 4. The warning prompts the user to contact a brokerage house or obtain up-to-date news information. The simple addition of an appropriate, well-known audio circuit 27 and speaker 29 as shown in FIG. 1 would provide such news.

The receiver shown in FIG. 3 may also include appropriate DC to DC converters, voltage regulators, and power up/down switches, all indicated by the numeral 128.

The receiver's circuitry is almost exclusively MOS (metal-oxide-semiconductor) type and, hence consumes relatively little power. The RAM 30 may be the most power intensive of the circuits, but since it is operated well below its maximum clock rate, its power consumption is reasonably low even if it is a dynamic RAM.

A RAM 30 consisting of three 16K dynamic RAMS will consume milliwatts in the "power down" state. The RAM 30 will consume an average power of approximately 150 milliwatts.

Keyboard and display circuitry consume about one watt when operating but less than 10 milliwatts average. The various warning displays consume a total of less than one milliwatt. The RF/IF/demodulator circuitry 24 and other appropriate circuits must operate continuously, as stated earlier. Together, they consume about 100 milliwatts. The various other circuits add another 100 milliwatts average to the power consumption. Total average power drain is thus approximately 360 milliwatts.

The receiver's power source 132 consists of a battery of four C cells. The average current supplied by the cells is thus about 20 milliamps assuming a 75% efficient power supply.

A low battery warning appears on the display as at 126 (in FIG. 4) when voltage from battery 132 dips below a predetermined level. The battery of rechargeable cells 130 forms a backup for the dry cells 132. It is sufficient to power the receiver while the dry cells are being changed.

As stated earlier, standard DC to DC converters, voltage regulators, and switches form the remainder of power supply 128.

The total number of integrated circuit packages necessary to form the circuit just described is approximately as follows:

Dual inline packages: eight 8-pin, 23 14/16-pin, three 24-pin, and four 40-pin dual inline packages. Also, four TO-220 voltage regulator packages would be required.

Circuitry of this size easily fits (along with the four C cells) in a package less than 8" high, 3" wide, and 1½" thick. A package of this size will comfortably fit into an inside coat pocket.

FIG. 4 illustrates the keyboard of the novel receiver 20 and include alphabetical keys 134, numerical keys 136, mathematical function keys 138, special designator keys 140, and enter and clear keys 142.

The alphabetical keys 134 are used to select the name of the stock or security in question. Thus, entering GTEc and the numerals 490 while mode switch 148 is in the quotation mode causes the display 38 to produce the selected stock or security name at 144 on display 38. The circuitry then accesses RAM 30 at that particular selected location and retrieves the current price of the security, for example, $59\frac{1}{8}$ as shown at 146 on the display. If it is desired that this information be printed, then printer switch 52 can be placed in the on position and the name of the selected security printed along with its current price. Thus, it is seen that the price of any desired security may be retrieved by entering through the keyboard the designation by which the security is known.

The numerical keys 136 may be used not only on conjunction with designating a particular stock or security whose price is to be reviewed, but may also be used for calculations when mode switch 148 is in the calculator mode or for entering changes in the time-of-day clock when the mode switch 148 is in the clock mode.

When the mode switch 148 is in the calculator mode, one not only uses the numerical keys 136 but also utilizes the function keys 138 in order to perform the necessary calculations.

Specialty keys 140 are used to designate preferred stock, convertible debentures, warrants, or a "when issued" security. The selection of any one of these particular keys in conjunction with a desired stock will allow a distinction to be made, for example, between the special stocks and common stock.

The enter and clear keys 142 are used in an obvious manner to clear the data on the display or to enter selected data such as the name of a particular security whose price is to be reviewed or the time-of-day change when the mode switch is in the clock mode. Also, tone switch 150 can be turned on or off so that the speaker which is located under slots 152 may be active or inactive as desired.

Thus, there has been disclosed a novel and unique portable quotator system which can be carried in the pocket and yet which keeps all stocks and their prices stored in its memory and is constantly and continuously updated with any price changes that may occur. Further, unique warnings or alerts can be transmitted to the user so that he can either check the latest changes of the securities in which he is interested or which alert him to check with a broker. In addition, he can utilize the calculator to do computations that may be necessary concerning his finances and also, of course, has the time-of-day clock which could include an alarm time if desired and/or a stop watch if desired.

While the invention has been described in connection with a preferred embodiment, it is not intended to limit the scope of the invention to the particular form set forth, but, on the contrary, it is intended to cover such alternatives, modifications, and equivalents as may be included within the spirit and scope of the invention as defined in the appended claims.

What is claimed is:

1. A portable hand held receiver for receiving serially transmitted data representing names and associated prices of security quotations, said receiver comprising:
   a. storage means for individually storing price data representing all of said names transmitted security quotations,
   b. a display, and
   c. means coupled to said storage means and said display for individually selecting stored price data representing any one of said named security quotations and displaying said price and name of said selected security quotation.

2. A price quotation system for conveying security quotations of interest to the financial community comprising:
   a. a transmitter for receiving any number of said quotations and broadcasting serial data representing each of said quotations,
   b. a handheld, portable receiver for receiving said serially broadcast data,
   c. means in said handheld receiver for automatically and continually storing each of said quotations represented by said serial data as it is received,
   d. a display on said handheld receiver, and
   e. means on said handheld receiver coupled to said storage means and said display means for individually selecting stored data representing any one of said quotations and displaying it as a selected quotation.

3. A handheld portable receiver for receiving transmitted data representing names and associated current prices of security quotations and associated selected financial data, said receiver comprising:
   a. storage means for individually storing said price and associated selected financial data representing each of any number of said named securities, said storage means comprising:
      (1) a plurality of memory locations, and
      (2) means for storing each price in a corresponding one of said memory locations designated by said associated name of said security quotation,
   b. a display, and
   c. means coupled to said storage means and said display for individually selecting stored price and selected financial data representing any one of said named securities and displaying said price and name and selected financial data of said selected security, said selecting means including a keyboard having manually operable selection keys for individually selecting any one of said stored price quotations and associated name for display.

4. A portable receiver as in claim 3 further including
   a. a clock circuit,
   b. a calculator circuit, and
   c. a mode selection switch for coupling either the clock circuit, the calculator circuit or the quotator circuit to the keyboard and display.

5. A portable receiver as in claim 3 wherein said memory locations are formed as part of a random access memory.

6. A portable receiver as in claim 5 further including a printer which may be used to print the name and price information of a selected security.

7. A portable price quotator system as in claim 3 further including:
   a. a warning code transmitted to said receiver, and
   b. an audible warning signal produced by said receiver when said warning code is received whereby the user thereof is alerted.

8. A portable price quotator system as in claim 7 wherein said warning code may represent:
   a. high market activity,
   b. inaccurate price information, and
   c. a predetermined price change of any preselected security.

9. A portable price quotator system as in claim 8 further including:
   a. a power-down code, and
   b. a power-up code which may be used by said receiver to permit said receiver to conserve power during periods without price update activity, and to return the receiver's memory to a state of readiness prior to receiving transmissions of new price update activity.

10. A handheld portable receiver for receiving transmitted data representing names and associated current prices of security quotations or associated selected financial data, said receiver comprising:
    a. storage means for individually storing said price or associated selected financial data representing each of any number of said named securities, said storage means comprising:
       (1) a plurality of memory locations, and
       (2) means for storing each price or said selected financial data in a corresponding one of said memory locations designated by said associated name of said security quotation,
    b. a display,
    c. means coupled to said storage means and said display for individually selecting stored price or associated selected financial data representing any one of said named securities and displaying said price and name of said selected security, said selecting means comprising a keyboard having manually operable selection keys for individually selecting any one of said stored price quotations or associated selected financial data and associated name for display,
    d. a clock circuit, and
    e. a mode selection switch for coupling either the clock circuit or the quotator circuit to the keyboard and display.

11. A handheld portable receiver for receiving transmitted data representing names and associated current prices of security quotations and associated selected financial data, said receiver comprising:
    a. storage means for individually storing price and selected financial data representing each of any number of said named securities, said storage means comprising:
       (1) a plurality of memory locations, and
       (2) means for storing each price in a corresponding one of said memory devices designated by said associated name of said security quotation,
    b. a display,
    c. means coupled to said storage means and said display for individually selecting stored price and selected financial data representing any one of said named securities and displaying said price and name of said selected security, said selecting means comprising a keyboard having manually operable selection keys for individually selecting any one of said stored price quotations, associated selected financial data and associated name for display,
    d. a calculator circuit, and
    e. a mode selection switch for coupling either the calculator circuit or the quotator circuit to the keyboard and display.

12. A price quotation system for providing security price quotations or other security information concerning a preselected security of interest to the system user comprising:
    a. at least one security exchange for providing signals representing said security price quotations and said other security information concerning a preselected security,
    b. a transmitter coupled to said at least one exchange for receiving any number of said security price quotations or other security information and broadcasting serial data representing each of said quotations or said other security information,
    c. a portable handheld receiver for receiving said serially broadcast data,
    d. means in said handheld receiver for automatically and continually storing for an indefinite time period each of said security price quotations or said other security information represented by said serial data as it is received,
    e. a display on said handheld receiver, and
    f. means on said handheld receiver coupled to said storage means and said display means for individually selecting stored price data or said other security information representing any one of said security price quotations and displaying it as selected data.

13. A method of conveying security quotations of interest to the financial community comprising the steps of:
    a. transmitting data representing any number of said quotations of interest,
    b. receiving said data with a portable, handheld receiver,
    c. providing a memory in said receiver for automatically and continually storing all of said data representing each of said quotations of interest,
    d. providing a display on said receiver, and
    e. selectively coupling data in said memory representing any desired one of said quotations of interest to said display for observation by the user thereof.

14. A method of receiving transmitted data representing names and associated current prices of security quotations and associated selected financial data comprising the steps of:
- a. individually storing in a plurality of memory devices in a portable handheld receiver said price and associated selected financial data representing each of all of said named transmitted securities,
- b. storing each price and associated selected financial data in a corresponding one of said memory locations designated by said associated name of said security quotation,
- c. individually selecting price and associated selected financial data stored in said memory devices representing any one of said named securities and displaying said price or associated selected financial data and name of said selected security, and
- d. individually selecting any one of said stored price quotations or associated selected financial data and associated name for display through a keyboard having manually operable selection keys.

15. A method as in claim 14 further including the steps of:
- a. providing a clock circuit in said receiver,
- b. providing a calculator circuit in said receiver, and
- c. providing a mode selection switch for coupling either the clock circuit, the calculator circuit or the quotator circuit to the keyboard and display.

16. A method as in claim 14 including the step of forming said memory devices as part of a random access memory.

17. A method as in claim 14 further including the step of printing the name and price information of a selected security.

18. A method of conveying quotations of interest as in claim 14 further including the steps of:
- a. receiving a transmitted warning code representing a particular function, and
- b. providing an audible warning signal in said receiver when said warning code is received.

19. A method of conveying quotations of interest as in claim 14 further including the steps of:
- a. receiving a transmitted power down code to permit the receiver to conserve power during periods without price update activity, and
- b. receiving a transmitted power up signal to return the receiver's memory to a state of readiness to receive price update activity.

20. A method of receiving transmitted data representing names and associated current prices of security quotations or associated selected financial data comprising the steps of:
- a. individually storing in a plurality of memory locations in a portable handheld receiver said price or associated selected financial data representing each of any number of said named securities,
- b. storing each price or associated selected financial data in a corresponding one of said memory locations designated by said associated name of said security quotation,
- c. individually selecting price or associated selected financial data stored in said memory locations representing any one of said named securities and displaying said price or associated selected financial data and name of said selected security,
- d. individually selecting any one of said stored price quotations or associated selected financial data and its associated name for display through a keyboard having manually operable selection keys,
- e. providing a clock circuit in said receiver, and
- f. coupling either the clock circuit or the quotator circuit to the keyboard and display by means of a mode selection switch.

21. A method of receiving transmitted data representing names and associated current prices of security quotations or associated selected financial data comprising the steps of:
- a. individually storing in a plurality of memory locations in a portable handheld receiver said price or selected financial data representing each of any number of said named securities,
- b. storing each price or associated selected financial data in a corresponding one of said memory locations designated by said associated name of said security quotation,
- c. individually selecting price or associated selected financial data stored in said memory locations representing any one of said named securities and displaying said price or associated selected financial data and name of said selected security,
- d. individually selecting any one of said stored price quotations or associated selected financial data and its associated name for display through a keyboard having manually operable selection keys,
- e. providing a calculator circuit in said receiver, and
- f. coupling either the calculator circuit or the quotator circuit to the keyboard and display by means of a mode selection switch.

22. A method of conveying security price quotations or other security information of interest to the system user comprising the steps of:
- a. coupling signals from at least one security exchange which represent said security price quotations or said other security information to a transmitter,
- b. transmitting said signals representing any number of said price quotations or other security information of interest,
- c. receiving said transmitted signals with a portable handheld receiver,
- d. providing a memory in said receiver for automatically and continually storing for an indefinite time period all of said data representing each of said price quotations or other security information of interest,
- e. providing a display on said receiver, and
- f. selectively coupling data in said memory representing any desired one of said price quotations or other security information of interest to said display for observation by the user thereof.

* * * * *

UNITED STATES PATENT AND TRADEMARK OFFICE
CERTIFICATE OF CORRECTION

PATENT NO. : 4,473,824
DATED : September 25, 1984
INVENTOR(S) : Richard N. Claytor It is certified that error appears in the above-identified patent and that said Letters Patent are hereby corrected as shown below:

Column 8, line 40, after "4K" and before "RAM" insert --static--.

Column 8, line 65, the word "tranmission" should be --transmission--.

Column 10, line 15, $\frac{HI}{AC}$ is not clear.

Column 10, line 27, $\frac{TP}{LT}$ is not clear.

Column 10, line 34, $\frac{LG}{CG}$ is not clear.

Column 10, line 41, $\frac{NE}{WS}$ is not clear.

Column 11, line 7, $\frac{LO}{BT}$ is missing.

Column 12, line 26, the word "names" should be --named--.

Signed and Sealed this

Fifth Day of March 1985

[SEAL]

Attest:

DONALD J. QUIGG

*Attesting Officer*     *Acting Commissioner of Patents and Trademarks*